Dec. 5, 1961     A. M. MOEN     3,011,512
ANTI-SIPHONING DEVICE
Filed Aug. 24, 1959
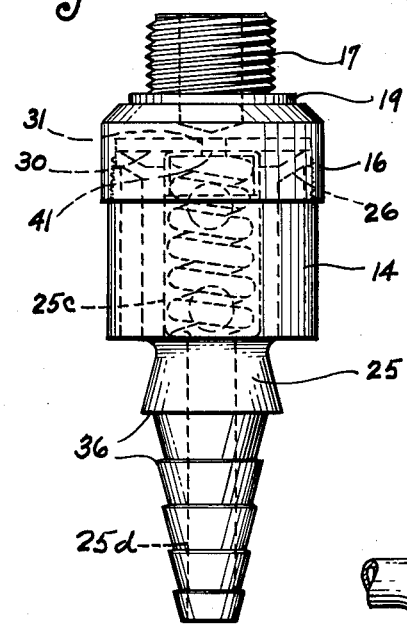
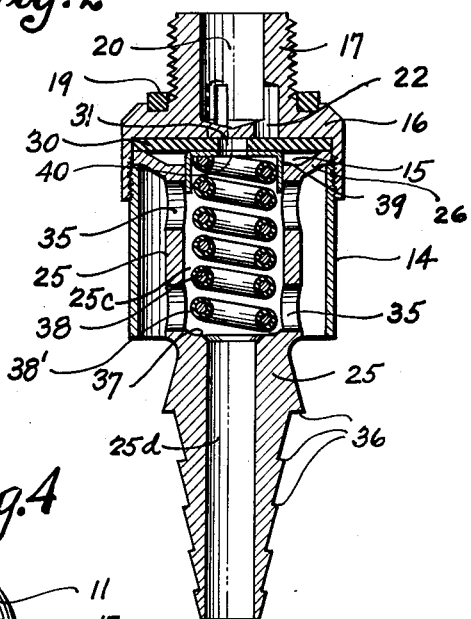
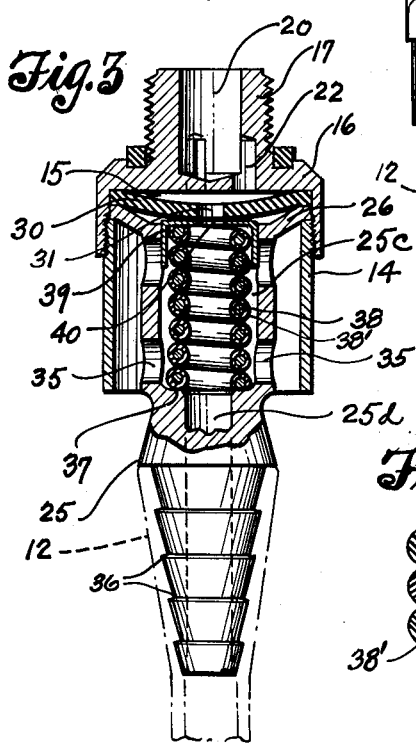
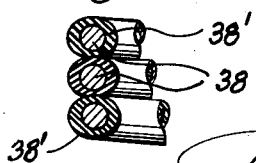
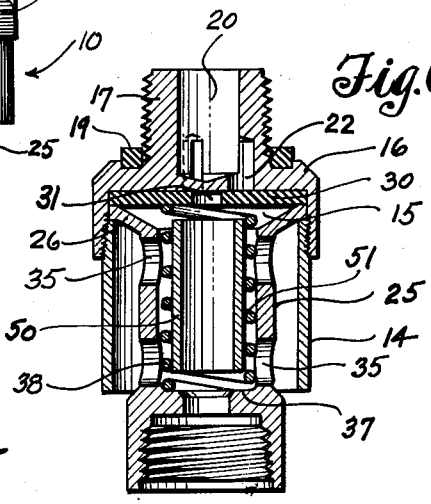
INVENTOR.
ALFRED M. MOEN
BY
Robinson & Berry
ATTORNEYS United States Patent Office 3,011,512
Patented Dec. 5, 1961

3,011,512
ANTI-SIPHONING DEVICE
Alfred M. Moen, 151 Lakeview Drive, Grafton, Ohio
Filed Aug. 24, 1959, Ser. No. 835,685
5 Claims. (Cl. 137—218)

This invention relates to improvements in articles most commonly referred to in the industry to which they pertain as "anti-siphoning fittings" or "vacuum breakers" and it has for its principal object to provide an article of that character that is relatively inexpensive, simple in its construction and mode of use; that can be easily and readily applied to a water supply line, or the like, for its intended use and when properly applied will operate in a practical and efficient manner, to drain the unit and nullify any condition of vacuum or suction that may, for any reason, be produced in the supply line incident to the loss of supply line pressure.

It is a further object of this invention to provide a fitting of the character above stated that, when properly applied in a supply line, or the like, as for example, as a connector between a water faucet and a discharge tube, will operate automatically to permit an inflow of outside air to the interior of the fitting and thus prevent any back flow of liquid through the hose and to the faucet that might be caused by suction created in the open supply line incident to any discontinuance of supply line pressure.

More specifically stated, the present invention resides in the provision of a fitting that is designed to be used as a connector between a supply pipe, such as a city service water line and a discharge pipe or tube, and in which fitting a novel arrangement of means is provided for delivery of the incoming liquid from the supply pipe to the discharge tube without leaking but which means automatically opens for admittance of outside air to effect the draining of the fitting and nullify any condition that might result in siphoning liquid to the supply line.

It is a further object of this invention to provide an anti-siphoning fitting of the kind or character above stated wherein the means provided for effecting the automatic admittance of outside air embodies, as one of its principal elements, a tubular coiled spring.

Still further objects of the invention reside in the details of construction of its various parts and in their combination and mode of operation as hereinafter described.

In accomplishing the above mentioned and other objects of this invention, I have provided the improved details of construction, the preferred forms of which are illustrated in the accompanying drawings, wherein—

FIG. 1 is an outside elevation of an anti-siphoning fitting embodied by the present invention.

FIG. 2 is a cross-section, taken axially of the fitting, as on line 2—2 in FIG. 1; showing the coiled spring and the open spaces between its turns when liquid is not flowing through the fitting.

FIG. 3 is a similar view showing the closed joints between the turns of the coiled spring when liquid, under line pressure is flowing through the fitting.

FIG. 4 is a view illustrating the normal way in which the present fitting is applied as a connector between a water supply faucet and discharge tube.

FIG. 5 is an enlarged cross-sectional detail of a part of the spring used in the fitting when under compression.

FIG. 6 is an axial cross-section of an alternative form of fitting embodied by this invention.

Referring more in detail to the drawings—

In FIG. 4 I have shown the usual way, in which anti-siphoning fittings of the present invention may be applied for use. In this view the fitting is designated in its entirety by reference numeral 10 and it is shown to be applied to what may be the discharge spout 11 of a water faucet and has a hose 12 leading from its discharge end. It is necessary that the liquid supplied through the faucet shall be under the usual or a reasonable pressure and it is possible that the hose 12 may be extended to and have its discharge end submerged in liquid in a basin or other form of receptacle for retaining outflow from the hose.

The device of this invention, in its present preferred form, as seen in FIGS. 1, 2 and 3 comprises a short cylindrical body 14 threaded at its upper end into a shallow downwardly opening chamber 15 of a cap-like fitting 16 which is provided centrally on its top side with an exteriorly threaded neck or nipple 17 whereby a connection may be made with a faucet or the like, supplying liquid under pressure as from a city service water line. In FIG. 4, this connection is shown as being made by threading the neck 17 into the discharge spout 11 of a faucet; the joint being sealed against leakage by an interposed gasket 19 applied to part 16 as seen in FIG. 2.

The neck portion 17 of the fitting 16 is shown to be coaxially bored as at 20 to provide for inflow of water and leading from the lower end of this bore, eccentrically thereof, are passages 22 that open directly through the flat top surface of the downwardly opening chamber 15 of the fitting 16. Disposed coaxially within the cylindrical body 10 is a tubular fitting 25 formed at its upper end with an upwardly directed annular flange 26 that seats, about its peripheral edge portion, upon the upper end surface of the cylindrical body 14 as threaded upwardly into the chamber 15. Located between the flat top surface of the chamber and the flanged upper end of the fitting 25 is a flexible disk or diaphragm 30, of rubber or the like formed at its center with a liquid discharge hole 31 of relatively small area.

It is shown in FIGS. 2 and 3 that the edge of the flexible diaphragm 30 is clamped in a water tight joint between the peripheral edge of the flange 26 and top or upper end surface of the chamber into which the body 14 is threaded. Also, it is to be noted that the flanged upper surface of fitting 25 is downwardly dished to substantial extent to permit downward flexing of the diaphragm.

That portion of the tubular fitting 25 which is enclosed by the body 14 is of substantially lesser outside diameter than the interior diameter of the body 14 and is formed with a plurality of air ports 35 opening into its tubular passage. The lower end portion of fitting 25 is formed with a series of annular ribs 36 designed to facilitate the securement of the hose 12 thereon. Also, the passage that extends axially through fitting 25 is of two diameters and thus provides an upwardly facing shoulder 37 therein. The upper end portion of the passage through the tubular fitting 25 is herein designated at 25c and will be referred to as the "spring chamber." It is of cylindrical form and opens at its upper end directly into the chamber 15. The lower end portion of the tubular passage, which is of lesser diameter, is designated herein by reference numeral 25d and will be referred to as the "dicsharge passage." Seated on the shoulder 37 is the lower end of a coiled spring 38 which is loosely and co-axially contained in the spring chamber 25c. The spring has its upper end contained in a short metal cap 39 which has a sliding telescopic fit in the upper end of the spring chamber and bears upwardly against the under side of the rubber diaphragm 30. This cap has a hole 40 through its top registering with the hole 31 of the diaphragm. It is to be observed however, that hole 31 is not in registration with any of the discharge ports 22 in part 16.

The coiled spring 38 has an inside diameter slightly greater than the discharge passage 25d through the lower end portion of fitting 25 and its convolutions or coils are rather closely spaced and are coated with or enclosed in a continuous rubber or plastic sleeve 38 as shown in FIG. 5. When no water is flowing through the fitting 10, the coated turns or convolutions of the spring are slightly spaced, as in FIG. 2, but when water is flowing into the chamber 15 under the intended diaphragm depressing pressure, they will be in close joint sealing contact, as in FIG. 3.

When the fitting 10 is properly applied for use, as, for example, in FIG. 4, between a faucet supplying liquid under pressure and a discharge tube, as at 12, its operation will be as follows:

When the faucet is opened, liquid therefrom, under pressure, enters the fitting 10 and acts through passages 22 against the diaphragm 30 and flexes it downwardly and causes it to act downwardly against cap 39 and to so compress the spring 38 that its rubber covered coils will be pressed tightly together and the normally open spaces between them tightly closed. The spring then functions as a non-leaking tubular duct through which the water flows directly from the diaphragm and cap ports, through the spring to hose 12. In the event that the supply line pressure should be temporarily discontinued and the faucet left open, the spring compressing force applied through the diaphragm is lost and the spring expands, thus restoring the open spaces between the coils of the spring. This admits air to the discharge passage 25d and permits the draining of the fitting. Also, any suction in the water supply line, that might be cause, for any reason, whereby liquid could be siphoned back through the hose 12 and diaphragm is counteracted by the admission of outside air to the line through the open air ports 35 in the fitting 25, and thence between the coils to the area of the spring chamber 25c. This is the siphoning or suction breaking function of the present fitting which takes place automatically with the loss of supply line pressure even though the diaphragm may be stuck or otherwise retained in open condition. As soon as supply line pressure is restored, the parts will again resume the relationship shown in FIG. 3; then with the closing of the faucet, the parts will resume the normal relationship of FIG. 2.

In the alternative device of FIG. 5 all parts are substantially the same as in the device of FIG. 1 and have been given like reference numerals. However, in this device the turns of the coiled spring are not encased in a rubber tube or plastic coating but are substantially spaced apart and a tube 50, of any suitable material, is enclosed coaxially within the spring. This tube is spot welded to the spring mid-way of its ends as at 51. Its length is such as to be spaced slightly, at its upper end from the diaphragm 30 when the latter is not depressed. Likewise, its lower end is slightly spaced from the spring supporting shoulder 37 in fitting 25. Thus, to admit outside air to the discharge passage and supply line in the event of lack or loss of fluid pressure in the line. The length of tube 50, however, is sufficient that, under normal line pressure, the downward flexing of the diaphragm 30 will cause the opposite ends of this tube to be sealed with the diaphragm and shoulder 37 for the outflow of liquid received from the faucet in the same manner as previously described.

Devices of the kinds described are easy to apply, effective in use and can be equipped with various means for their convenient connection to faucets, supply lines and discharge pipes, tubes or hoses.

What I claim as new is:

1. An anti-siphoning fitting adapted for insertion in a liquid delivery line, said fitting comprising a diaphragm chamber, a receiving port at one end of said chamber for the flow of liquid therethrough, a discharge member including a passage therethrough leading from the opposite end of said chamber, means permitting the inflow of air to said discharge passage, a flexible diaphragm dividing the chamber between said receiving port and said discharge passage, an opening in said diaphragm in alignment with said discharge passage, a liquid conducting member resiliently and movably disposed with clearance within and lengthwise of said discharge passage, said liquid conducting member being engageable with and movable by said flexible diaphragm incident to the delivery of liquid against said diaphragm and said liquid conducting member normally permitting air to pass therethrough and being sealed liquid tight by pressure from said diaphragm.

2. The device as in claim 1 wherein said liquid conducting member includes a coiled spring and a tube secured to the spring intermediate the ends thereof and said tube being of greater length than the spring when the spring is compressed to the maximum extent.

3. The anti-siphoning fitting recited in claim 1 wherein said liquid conducting member comprises a coiled spring with its turns normally slightly spaced, and which is rendered serviceable as a liquid tight duct by the endwise compression thereof effected by pressure of the flexed diaphragm thereagainst.

4. The device of claim 3 wherein said discharge member includes a tube formed at its top end with a peripheral flange threaded into said chamber and thereby tightened against the periphery of said diaphragm to clamp and seal the latter in the chamber, said tube including a downwardly dished top surface forming the lower end wall of the chamber, a spring chamber with said tube and said spring being positioned within said spring chamber.

5. The device of claim 4 wherein a cylindrical cap is applied over the upper end of said spring and is telescopically received in the upper end of said spring chamber.

References Cited in the file of this patent
UNITED STATES PATENTS

| | | |
|---|---|---|
| 2,189,694 | Work | Feb. 6, 1940 |
| 2,362,232 | Anschecks | Nov. 7, 1944 |
| 2,600,731 | Carlton | June 17, 1952 |
| 2,646,063 | Hayes | July 21, 1953 |

FOREIGN PATENTS

| | | |
|---|---|---|
| 711,693 | France | June 30, 1931 |